United States Patent [19]
Greenwood

[11] Patent Number: 4,832,921
[45] Date of Patent: May 23, 1989

[54] APPARATUS FOR REGENERATION OF HYDROCARBON CONVERSION CATALYST

[75] Inventor: Arthur R. Greenwood, Niles, Ill.

[73] Assignee: UOP Inc., Des Plaines, Ill.

[21] Appl. No.: 920,473

[22] Filed: Oct. 20, 1986

Related U.S. Application Data

[62] Division of Ser. No. 814,337, Dec. 27, 1985, Pat. No. 4,647,549.

[51] Int. Cl.$^4$ .............................................. B01J 38/44
[52] U.S. Cl. ...................... 422/223; 208/108; 208/140; 422/238; 502/37; 502/47
[58] Field of Search ............... 422/216, 223, 199, 200, 422/201, 238; 208/140, 169, 173, 176, 108; 502/35–37, 45–48; 34/65, 174

[56] References Cited

U.S. PATENT DOCUMENTS

| | | | |
|---|---|---|---|
| 2,245,664 | 6/1941 | Gronert | 34/65 |
| 2,654,590 | 10/1953 | Molenaar | 34/65 |
| 2,706,343 | 4/1955 | Oholm | 34/65 |
| 2,918,436 | 12/1959 | Shabaker | 502/47 |
| 3,652,231 | 3/1972 | Greenwood et al. | 422/223 |
| 4,294,019 | 10/1981 | Seitmann | 34/65 |

*Primary Examiner*—Benoit Castel
*Assistant Examiner*—Jill Johnston
*Attorney, Agent, or Firm*—Thomas K. McBride; John G. Tolomei

[57] ABSTRACT

A vessel for effecting multiple treatment steps needed to regenerate spent hydrocarbon conversion catalyst. Regeneration is accomplished in a moving bed of catalyst, where catalyst is passed through several treatment zones in the regeneration vessel. Catalyst is contacted with a hot oxygen-containing gas stream in order to remove coke which accumulates on the catalyst while it is in a hydrocarbon conversion zone. After the coke is burned off in a combustion zone, catalyst is passed into a drying zone for removal of water formed in the combustion zone which has remained on the catalyst instead of being carried off with combustion gases. Water removal is accomplished by passing a hot dry air stream through the catalyst. This air stream is introduced into the bottom of the regeneration vessel and is heated by exchange of heat with catalyst, thereby effecting the required cooling of the catalyst. Before passing into the drying zone, the air is heated further by heating element located in the vessel. After passing through the drying zone, the air stream provides oxygen for combustion in the combustion zone.

5 Claims, 1 Drawing Sheet

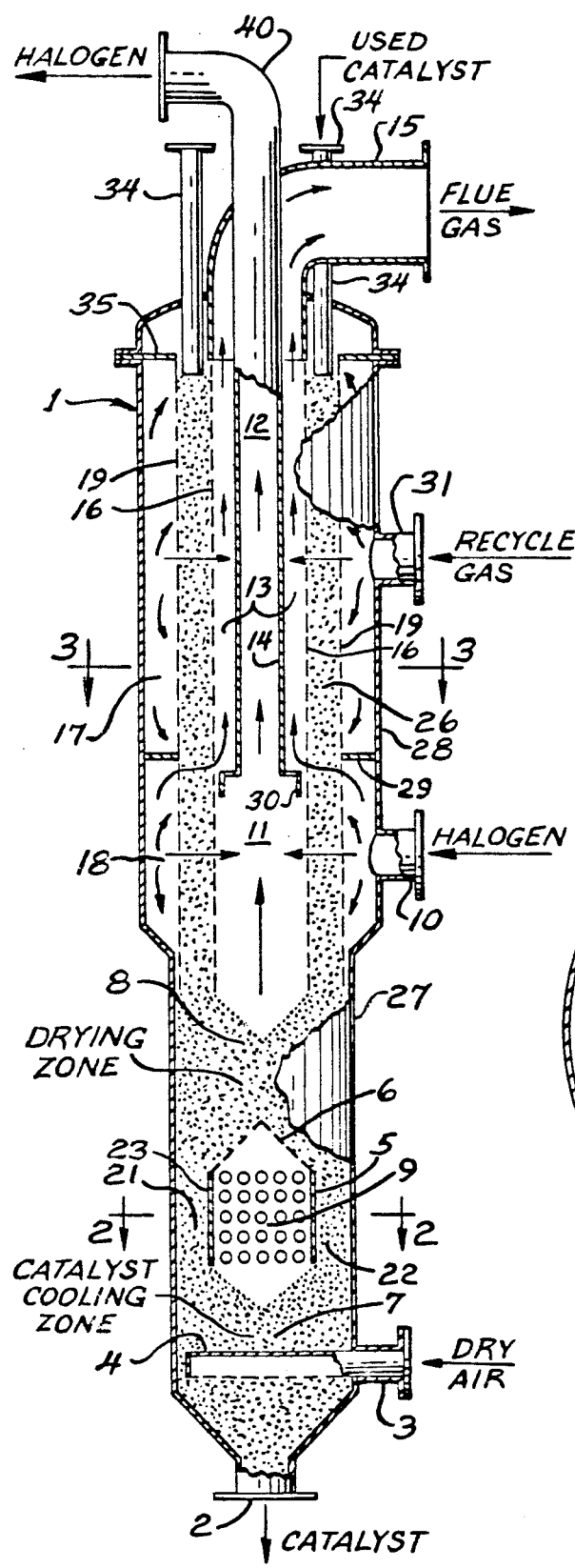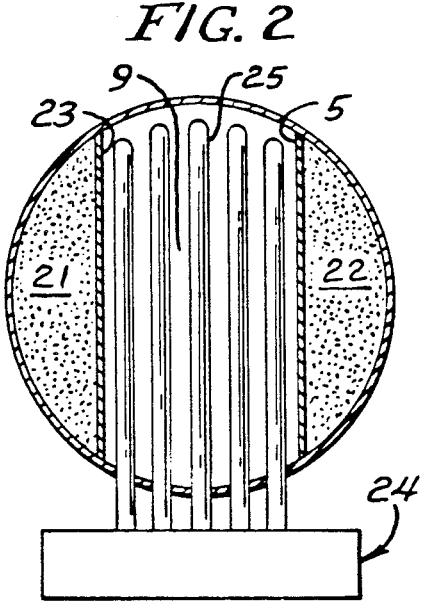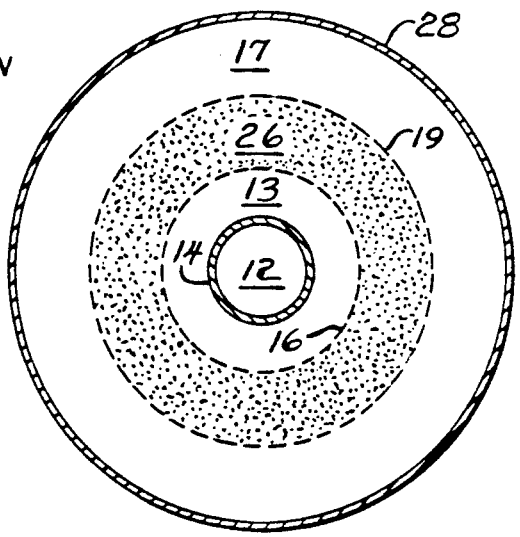

४,८३२,९२१

APPARATUS FOR REGENERATION OF HYDROCARBON CONVERSION CATALYST

This is a divisional of allowed application Ser. No. 814,337 filed Dec. 27, 1985 now U.S. Pat. No. 4,647,549.

FIELD OF THE INVENTION

This invention relates to the art of catalytic conversion of hydrocarbons to useful hydrocarbon products. More specifically, it relates to the reconditioning of spent catalyst so that the catalyst can be reused in a hydrocarbon conversion reaction.

BRIEF SUMMARY OF THE INVENTION

The present invention is a single vessel for effecting multiple treatment steps needed to regenerate, or reactivate, spent, or deactivated, hydrocarbon conversion catalyst. Catalyst regeneration is accomplished in a moving bed mode, where catalyst is passed through various treatment zones. Catalyst is passed downwardly through a regeneration vessel by gravity.

Catalyst is contacted with a hot oxygen-containing gas stream in order to remove coke which accumulates on surfaces of the catalyst while it is in a hydrocarbon conversion reaction zone. Coke is comprised primarily of carbon but is also comprised of a relatively small quantity of hydrogen. The mechanism of coke removal is oxidation to carbon dioxide and water. After passing through a combustion zone, catalyst is passed into a drying zone for removal of water formed in the combustion zone which has remained on the catalyst instead of being carried off with combustion gases. Water removal is accomplished by passing a hot dry air stream through the catalyst. Dry catalyst is passed into a catalyst cooling zone, where it is cooled by direct contact with a dry air stream. After cooling is accomplished, catalyst is passed out of the regeneration vessel which comprises the present invention.

A dry air stream is introduced into the bottom of the regeneration vessel and flows upward, countercurrent to catalyst flow. The air stream is heated in the catalyst cooling zone by exchange of heat with catalyst and further heated by heating coils located in the regeneration vessel above the catalyst cooling zone. After being heated the air stream passes through the catalyst drying zone to accomplish removal of water and then passes into the gas collection portion of the combustion zone, where it mixes with the gas produced by combustion and inert gases which have passed through the catalyst. This mixture, termed flue gas, is withdrawn from the combustion zone and a portion of it is recycled back to the combustion zone to contact the catalyst to effect coke burn-off. The portion which is not recycled is simply vented to atmosphere. Thus the same air is used for catalyst cooling, catalyst drying, and combustion of coke. In the regeneration of catalyst used in the hydrocarbon conversion reaction of catalytic reforming, an additional regeneration step may be necessary, as will be discussed below.

It is an object of this invention to eliminate the use of water in cooling catalyst, thereby making it unnecessary to provide a separate vessel to contain catalyst during the cooling process.

It is also an object of this invention to effect savings in utilities cost by recovering heat from the catalyst.

It is also an object of this invention to enhance the safety of the regeneration procedure by eliminating the possibility of rupture of a water-containing tube in contact with catalyst.

It is a further object of this invention to reduce capital costs by eliminating a catalyst cooling vessel and the coils associated therewith and by replacing a large air heater in a vessel separate from the regeneration vessel by a small heating means located within the regeneration vessel.

In a broad embodiment, the invention comprises a vertically-positioned vessel through which catalyst particles may move by gravity, which vessel has a cylindrical upper section comprised of a burn zone and a cylindrical lower section having a smaller diameter than said upper section and comprised of a catalyst drying zone, an air heating zone, a catalyst cooling zone, and a catalyst outlet nozzle located at the lower end of the lower section; two vertical cylindrical catalyst retention screens having differing diameters which extend substantially throughout said vessel upper section, which are concentric with one another to form an annular volume through which a descending bed of catalyst may move by gravity, where said annular volume communicates with said catalyst drying zone in said vessel lower section, and which are concentrically disposed in said vessel upper section to form an annular space for distribution of gas between the vessel wall and the larger diameter screen; at least one spent catalyst inlet nozzle on said vessel and at least one internal catalyst inlet conduit which is connected to said catalyst inlet nozzle and communicates with a top portion of said annular descending bed of particles retained by said catalyst retaining screens; at least one recycle gas inlet nozzle on said vessel which communicates with said annular gas distribution space; at least one flue gas outlet nozzle on said vessel which communicates with a cylindrical central space enclosed by said smaller diameter catalyst retention screen; said catalyst drying zone, which comprises the uppermost portion of said vessel lower section and is in communication with said annular bed of catalyst; said air heating zone, which is located immediately below said catalyst drying zone and comprises means for heating an upward flowing stream of air; and, said catalyst cooling zone, having an air inlet nozzle on said vessel, and having means for air distribution connected to said air inlet nozzle, which cooling zone is located immediately below said air heating zone, where said air distribution means is disposed in a horizontal plane located in a lower portion of the cooling zone such that air may be distributed in a substantially uniform manner over said horizontal plane.

When a catalyst must be halogenated as a part of the regeneration process, the invention further comprises a catalyst halogenation zone which is comprised of an extended portion of said vessel upper section and said catalyst retention screens, which extended portion is located below said burn zone, where said annular volume formed by said catalyst retention screens communicates with said catalyst drying zone, and which further comprises a horizontal annular-form partition located in said upper section annular space for distribution of gas at an upper boundary of said halogenation zone and extending between the vessel sidewall and the larger diameter screen to prevent gas flow between the halogenation zone and the burn zone in said annular gas distribution space; at least one halogen inlet nozzle on said vessel which communicates with said halogenation zone annular gas distribution space; at least one halogen outlet nozzle and at least one halogen outlet conduit connected to said halogen outlet nozzle and in communication with said central space enclosed by said smaller diameter screen; and, flow directing means which are located in order to direct a portion of gas flowing upward in said central space in the halogenation zone into said halogen outlet conduit and in order to divert a portion of gas flowing in said gas distribution space in the halogenation zone through the catalyst bed and into said central space in said burn zone.

INFORMATION DISCLOSURE

U.S. Pat. No. 3,652,231 (Greenwood et al.) shows regeneration apparatus which is similar in certain aspects to that of the present invention, but which does not have a catalyst cooling zone or a dry air heating zone. '231 also describes a continuous catalyst regeneration process which is used in conjunction with catalytic reforming of hydrocarbons. U.S. Pat. Nos. 3,647,680 (Greenwood et al.) and 3,692,496 (Greenwood et al.) are examples of patents which also describe regeneration of reforming catalyst.

U.S. Pat. No. 3,838,038 lists exemplary hydrocarbon conversion processes with which moving bed regeneration apparatus may be used (column 6); the list includes hydrocracking and other hydroprocessing applications, isomerization, alkylation, and dehydrogenation.

U.S. Pat. No. 3,978,150 (McWilliams), which discloses a process for catalytic dehydrogenation of saturated normal paraffins, especially those having two to six carbon atoms per molecule, uses a catalyst which may be regenerated in apparatus designed in accordance with '231, though the halogenation section is not required (see column 7). Additional dehydrogenation catalysts which may be regenerated using the apparatus of the present invention may be seen in U.S. Pat. Nos. 4,438,288 (Imai et al.) and 4,506,032 (Imai et al.).

U.S. Pat. No. 3,745,112 (Rausch) discloses a catalyst of broad utility which is preferably regenerated by means of a moving bed process which may be practiced in apparatus of the present invention.

BACKGROUND OF THE INVENTION

When a moving bed continuous catalyst regeneration system such as is shown in certain of the above-cited patents (for example, '496 and '680) is utilized to regenerate catalyst used in catalytic reforming, it is the usual practice to cool the catalyst after it is dried and before it is transported to a reducing zone. This is normally accomplished by passing catalyst removed from a regeneration vessel (such as shown in '231) through a cooling vessel wherein cooling is effected by water passing through coils located in the cooling vessel. It must be noted that the catalyst cooling step is omitted from the patents discussed above, even though cooling is a part of the regeneration process. In the regeneration of the catalysts of patents '288, '112, and '032 (cited above), it is necessary to cool the catalyst before it enters the reducing zone.

BRIEF SUMMARY OF THE DRAWINGS

FIG. 1 is a schematic representation of an embodiment of the invention. FIGS. 2 and 3 are section views taken as shown in FIG. 1, but which are drawn to a larger scale. Certain elements not relevant to the present invention have been omitted from the Drawings; for example, flange bolting at the top head of the vessel is not shown.

DETAILED DESCRIPTION OF THE INVENTION

FIGS. 1 through 3 will now be utilized as a vehicle to explain the invention; such use is not intended to limit the broad scope of the invention as presented in the claims. As noted above, the Drawings show only elements essential to a clear understanding of the invention. The teachings of U.S. Pat. Nos. 3,652,231, 3,647,680 and 3,692,496 (cited above) are hereby incorporated into this document; they may be consulted for additional detailed information.

As discussed in the patents mentioned herein, catalyst particles of the type which are regenerated in apparatus of the present invention are comprised of a substrate, such as alumina, in the form of spheres having a diameter of from about 1/32nd to about ¼th inch. The catalyst particles are also comprised of various materials which have been deposited on the substrate such as platinum and a halogen.

Referring now to FIG. 1, catalyst particles are introduced into regeneration vessel 1 by means of nozzles 34. Though two catalyst inlet nozzles are shown, only one nozzle or multiple nozzles may be utilized. There are two catalyst retention screens 16 and 19 within an upper section of regeneration vessel 1. The two catalyst retention screens are cylindrical in form, have as their central axis the central axis of the regeneration vessel and are concentrically disposed in an upper section of the regeneration vessel. Screens 16 and 19 form an annular volume through which a descending annular column, or bed, of catalyst 26 (see FIG. 3) moves by gravity. Catalyst inlet conduits which are extensions of nozzles 34 deliver catalyst at points spaced around the annular bed. The catalyst screens have openings sufficiently small to preclude catalyst particles from passing through the screens or becoming lodged in a screen. For a description of the screens, U.S. Pat. No. 3,652,231 may be consulted. The catalyst retention screens extend throughout the upper section of vessel 1 and deliver catalyst to catalyst drying zone 8.

An annular space which serves to distribute gas around the catalyst is formed between catalyst retention screen 19 and the sidewall 28 of the upper section of regeneration vessel 1. Gas enters this annular gas distribution space, denoted by reference number 17, by means of recycle nozzle 31. Annular-form partition 29 forms a barrier between gas distribution space 17 and a similar annular volume which is denoted gas distribution space 18. Gas flows radially from the annular gas distribution space through the catalyst retained between screens 16 and 19 and designated by reference number 26 to a cylindrical central space 13, a portion of which is occupied by halogen conduit 14.

The portion of the upper section of vessel 1 which is above partition 29 is termed the burn zone, where combustion of coke takes place. The portion of the upper section which extends below partition 29 is termed the halogenation zone. In certain applications, it is not necessary to utilize a halogenation zone and partition 29, halogen inlet nozzle 10, halogen outlet nozzle 40, and halogen outlet conduit 14 would be omitted. A gas comprising a halogen enters the zone via halogen nozzle 10 and flows through the catalyst in a radial manner, entering halogenation zone central space 11.

Screens 16 and 19 extend into the lower section of the column, which is of a smaller diameter than the upper section, as can be seen in FIG. 1. The outside diameter of screen 19 is slightly smaller than the inside diameter of the chamber lower section and the screens project into the lower section in order to provide a seal, so that substantially all of the gas contained in annular distribution space 18 flows through the catalyst instead of bypassing catalyst by flowing into the lower section of the regeneration vessel. Other sealing means may be utilized. Catalyst discharged from the annular space between the catalyst retention screens fills all of the lower section of the chamber 1, with the exception of the space below catalyst screen 6 which contains heating means. Catalyst moves downward through the lower section of the vessel and out of the vessel by means of catalyst outlet nozzle 2. It passes from the annular bed into and through catalyst drying zone 8, air heating zone 9, and catalyst cooling zone 7.

Nozzle 3 on regeneration vessel 1 is equipped with means for distributing air 4 to various points in a horizontal plane which is perpendicular to the descending catalyst, so that it will flow uniformly up the column in contact with all of the catalyst. Air entering the vessel is at a temperature of about 100 degrees Fahrenheit and has been dried so that it contains no more than about 5 parts per million (by volume) of water. Air passes upward through the catalyst in the portion of the lower section of the vessel designated as catalyst cooling zone 7 and is heated by the catalyst in cooling zone 7 to about 900 degrees Fahrenheit. In turn, the catalyst is cooled to between 300° and 400° Fahrenheit.

Means for further heating the upward flowing air is provided in the space denoted by reference number 9. The heating means may be tubes containing a heat transfer fluid, but are preferably electric resistance heating elements. FIG. 2 is a top section view of the portion of vessel 1 which contains the heating tubes or elements, which are denoted by reference number 25. Reference number 24 of FIG. 2 identifies the balance of the heating apparatus associated with tubes or elements 25. Catalyst flows past the heating means through downcomers, or catalyst passages, which are defined by plates 5 and 23 and portions of the sidewall 27 of the lower section of chamber 1. Vertical plates 5 and 23 are disposed along chords of a circle formed by the sidewall 27 and confine catalyst to the passages denoted by reference numbers 21 and 22. The top of the space occupied by the heating means is covered by a screen 6 in order to exclude catalyst particles from that space. Substantially all of the air passes through the heating means in space 9 in preference to passing upward through the catalyst in the downcomers, since the pressure drop of air flowing upward in the downcomers is much larger than that of air flowing upward through the heating means. The average temperature of the upflowing air after passing through the heating zone is about 1,000 degrees Fahrenheit.

The hot air passes upwardly through the catalyst located in that portion of the vessel designated as drying zone 8, removing moisture which is contained on the catalyst. Essentially all of the air moving up the column from drying zone 8 passes into the cylindrical central space enclosed by catalyst retention screen 16 which is denoted by reference number 11. A major portion of the air then enters halogen conduit 14 to flow out of the regeneration vessel via halogen nozzle 40. In most cases, the vessel is designed so that substantially all of the air enters conduit 14. This is accomplished by providing flow directing means, such as the enlarged end portion of conduit 14 which is denoted by reference number 30. By substantially is meant between 80% and 100% of the air entering central space 11. Gas comprising a halogen which has passed through the catalyst from gas distribution space 18 also enters conduit 14.

FIG. 3 is a top section view of vessel 1, taken as shown in FIG. 1. Halogen conduit 14 is centered on the vertical axis of the vessel. Catalyst retention screens 16 and 19 enclose the downward moving columns of catalyst 26. Gas in annular gas distribution space 17 flows radially through the catalyst to the central space 13 which is defined by screen 16 and conduit 14. The interior of conduit 14 is denoted by reference number 12.

A portion of the gas comprising a halogen which enters via halogen nozzle 10 passes through the annular bed of catalyst, but enters central space 13 instead of central space 11. This diversion of gas is accomplished by flow directing means 30. It is this portion of gas which provides oxygen for combustion, as explained below.

Gas leaving the vessel through nozzle 40 is compressed (not shown) and recycled to the regeneration vessel by means of halogen inlet nozzle 10. Chlorine and steam are added to the recycled gas and it is heated before being returned to the vessel. The gas is primarily air, since it comprises substantially all of the air flowing upward from the lower section of the vessel. Gas entering the chamber through nozzle 10 is confined to the halogenation zone by partition 29. Gas containing the halogen is distributed about the annular space 18 and passes radially through the portion of the catalyst bed located below baffle 29, thus accomplishing halogenation of the catalyst. It mixes with upward flowing air in central space 11 and then enters halogen conduit 14.

Recycle gas enters annular gas distribution space 17 by means of nozzle 31 and passes radially through the bed of catalyst particles to the annular central space 13, which is defined by the outer surface of conduit 14 and screen 16. Gas passing through the catalyst in the burn zone provides the oxygen for combustion of carbon on catalyst in the burn zone and then mixes with the portion of upwardly flowing gas from the halogenation zone that did not enter conduit 14 and the mixture, denoted flue gas, flows out of the vessel by means of nozzle 15. A portion of the gas is vented to atmosphere, via a scrubber if necessary, and the balance is compressed and returned to the vessel via nozzle 31. If necessary, such as to remove sulfur oxides, the recycle gas is scrubbed before it is returned to the vessel via nozzle 31.

Gas flows may be summarized as follows. There are two gas recycle loops. In the halogenation loop, air leaves nozzle 40 and is recycled to enter nozzle 10. A small amount of halogen and steam is added before the air enters nozzle 10. Substantially all of the air leaving the drying zone mixes with the air passing through the catalyst to flow out via nozzle 40. A portion of the air entering nozzle 10 is diverted into the burn zone. It can be seen that the quantity of air diverted to the burn zone is approximately equal to the quantity of air flowing upward in the lower section of the regeneration vessel.

In the flue gas loop, flue gas leaves the vessel via nozzle 15 and is recycled to enter nozzle 31. It may be passed through a scrubber before entering nozzle 31. Air diverted from the halogenation zone joins the flue gas loop to provide combustion oxygen. There is a vent to atmosphere in the flue gas loop in order to maintain a material balance.

It is not necessary that halogen outlet nozzle 40 and halogen conduit 14 be located as shown in FIG. 1, passing through flue gas outlet nozzle 15. It is apparent that there are numerous other configurations which will achieve the objective of partitioning the gas flow between the two outlet nozzles.

Further details on catalyst regeneration may be found in the above-cited patents. If wet catalyst is passed to the next regeneration step, which is reduction (not discussed herein), proper re-dispersion of platinum on the alumina will not take place. Certain catalysts must be cooled to below 500 degrees Fahrenheit and reheated in the presence of reduction gas in order to achieve a fully active catalyst.

It should be noted that the temperatures given in connection with the process of the detailed example presented above do not apply to every embodiment of the present invention and are not intended to limit the scope of the invention. For example, dry air entering the catalyst cooling zone may range from about 100° F. to about 400° F. and air entering the burn zone may range from 900° F. to about 1400° F.

I claim as my invention:

1. Apparatus for effecting regeneration of spent catalyst particles used in hydrocarbon conversion reactions having an arrangement that permits cooling and heating of the catalyst particles with a single air stream and one air heating zone, said apparatus comprising:
    (a) a vertically-positioned vessel through which catalyst particles may move by gravity, which vessel has a cylindrical upper section comprised of burn zone and a cylindrical lower section having a smaller diameter than said upper section and comprised of a catalyst drying zone, an air heating zone, a catalyst cooling zone, and a catalyst outlet nozzle located at the lower end of the lower section;
    (b) two vertical cylindrical catalyst retention screens having differing diameters which extend substantially throughout said vessel upper section, which are concentric with one another to form an annular volume through which a descending bed of catalyst may move by gravity, where said annular volume communicates with said catalyst drying zone in said vessel lower section, and which are concentrically disposed in said vessel upper section to form an annular space for distribution of gas between the vessel wall and a larger diametered of said two vertical cylindrical catalyst retention screens;
    (c) at least one spent catalyst inlet nozzle on said vessel and at least one internal catalyst inlet conduit which is connected to said catalyst inlet nozzle and communicates with a top portion of said annular volume formed by said catalyst retaining screens;
    (d) at least one recycle gas nozzle on said vessel which communicates with said annular gas distribution space;
    (e) at least one flue gas nozzle on said vessel which communicates with a cylindrical central space enclosed by said smaller diameter catalyst retention screen;
    (f) said catalyst drying zone, comprises the uppermost portion of sad vessel lower section and is in communication with said annular bed of catalyst;
    (g) said air heating zone, which is located immediately below said catalyst drying zone and comprises a plurality of heating elements passing through the center of said heating zone for heating an upward flowing stream air, at least on catalyst flow passage located about the periphery of said air heating zone and means for preventing contact between said heating elements and said catalyst particles; and,
    (h) said catalyst cooling zone, having an air inlet nozzle on said vessel, and having means for air distribution connected to said air inlet nozzle, which catalyst cooling zone is located immediately below said air heating zone, where said air distribution means is disposed in a horizontal plane located in a lower portion of the cooling zone such that air may be distributed in a substantially uniform manner over said horizontal plane.

2. The apparatus of claim 1 further comprising a catalyst halogenation zone which is comprised of an extended portion of said cylindrical upper section and said two catalyst retention screens, which extended portion is located below said burn zone, where said annular volume formed by said catalyst retention screens communicates with said catalyst drying zone, and which further comprises:
    (a) a horizontal annular-form partition located in said upper section annular space for distribution of gas at an upper boundary of said halogenation zone and extending between the vessel sidewall and the larger diameter screen prevent gas flow between the halogenation zone and the burn zone in said annular gas distribution space;
    (b) at least one halogen inlet nozzle on said vessel which communicates with said halogenation zone annular gas distribution space;
    (c) at least one halogen outlet nozzle and at least one halogen outlet conduit connected to said halogen outlet nozzle and in communication with said central space enclosed by said smaller diameter screen; and
    (d) flow directing means positioned and arranged to direct a portion of gas flowing upward in said central space in the halogenation zone into said halogen outlet conduit and in order to divert a portion of gas flowing in said gas distribution space in the halogenation zone through the catalyst bed and into said central space in said burn zone.

3. The apparatus of claim 1 wherein said air heating zone includes means for directing downward-flowing catalyst particles into said catalyst flow passage.

4. The apparatus of claim 3 wherein said air heating zone is comprised of two catalyst downcomers, each downcomer is bounded by a portion of a sidewall of said cylindrical lower section and a flat plate in a chordal relationship with said sidewall, where a pair of flat plates of each downcomer are parallel to one another ran to a longitudinal axis of said vessel and comprise at least part of said means for directing downward-flowing catalyst.

5. The apparatus of claim 4 wherein said heating elements comprise heating tubes located in a space between the pair of flat plates of each said downcomer and a screen extends between said pair of flaten plates and covers said tubes to pass upward but prevent downward entry of catalyst particles into said space between said pair of flat plates of each said downcomer.

Favorable reconsideration of this application is requested in view of above amendments and the following remarks.

* * * * *